(12) United States Patent
Larsson et al.

(10) Patent No.: US 11,399,309 B2
(45) Date of Patent: Jul. 26, 2022

(54) TRANSMISSION BLOCK SIZE DETERMINATION

(71) Applicant: Telefonaktiebolaget LM Ericsson (publ), Stockholm (SE)

(72) Inventors: Daniel Larsson, Lund (SE); Jung-Fu Cheng, Fremont, CA (US); Magnus Stattin, Upplands Väsby (SE); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 961 days.

(21) Appl. No.: 16/069,143

(22) PCT Filed: May 3, 2018

(86) PCT No.: PCT/SE2018/050460
§ 371 (c)(1),
(2) Date: Jul. 10, 2018

(87) PCT Pub. No.: WO2018/203818
PCT Pub. Date: Nov. 8, 2018

(65) Prior Publication Data
US 2021/0211930 A1     Jul. 8, 2021

Related U.S. Application Data

(60) Provisional application No. 62/505,158, filed on May 12, 2017, provisional application No. 62/501,815, filed on May 5, 2017.

(51) Int. Cl.
*H04W 28/06* (2009.01)
*H04L 1/00* (2006.01)

(52) U.S. Cl.
CPC .......... *H04W 28/06* (2013.01); *H04L 1/0003* (2013.01); *H04L 1/0007* (2013.01); *H04L 1/0031* (2013.01)

(58) Field of Classification Search
None
See application file for complete search history.

(56) References Cited

U.S. PATENT DOCUMENTS

| | | | |
|---|---|---|---|
| 2008/0285512 A1* | 11/2008 | Pan ...................... | H04L 1/0026 370/329 |
| 2009/0232070 A1* | 9/2009 | Muharemovic ....... | H04L 1/1671 370/329 |

(Continued)

FOREIGN PATENT DOCUMENTS

| | | |
|---|---|---|
| EP | 3131225 A1 | 2/2017 |
| WO | WO 2016018079 A1 | 8/2017 |

OTHER PUBLICATIONS

International Search Report and Written Opinion of the International Searching Authority, PCT/SE2018/050460, dated Sep. 13, 2018, 14 pages.

(Continued)

*Primary Examiner* — Anh Vu H Ly
(74) *Attorney, Agent, or Firm* — Sage Patent Group

(57) ABSTRACT

There is provided mechanisms for operation in a communication network. A method in a wireless device adapted for operation in the communication network comprises obtaining a pre-defined rule for computing a default transmission data block size on the basis of one or more input parameters selected from: a number of allocated physical resource blocks, a number of allocated time-domain symbols, an effective number of resource elements per physical resource block and/or symbol, a number of spatial layers, a modulation order, and a code rate.

28 Claims, 11 Drawing Sheets

(56) References Cited

U.S. PATENT DOCUMENTS

| | | | |
|---|---|---|---|
| 2012/0008574 A1* | 1/2012 | Xiao | H04W 72/042 |
| | | | 370/329 |
| 2012/0320816 A1 | 12/2012 | Kim et al. | |
| 2014/0153484 A1 | 6/2014 | Kim et al. | |
| 2015/0271802 A1* | 9/2015 | Kang | H04L 27/34 |
| | | | 370/329 |
| 2015/0341956 A1* | 11/2015 | Sun | H04L 5/0001 |
| | | | 370/329 |
| 2017/0026297 A1* | 1/2017 | Sun | H04L 1/0067 |
| 2017/0223686 A1 | 8/2017 | You et al. | |
| 2019/0059020 A1* | 2/2019 | Ge | H04L 1/00 |
| 2019/0132079 A1* | 5/2019 | Saito | H04W 72/14 |
| 2019/0349115 A1* | 11/2019 | Lin | H04L 1/0003 |
| 2019/0364585 A1* | 11/2019 | Lee | H04L 5/0044 |

OTHER PUBLICATIONS $3^{RD}$ Generation Partnership Project, 3GPP TS 36.213 V14.2.0, Technical Specification Group Radio Access Network; Evolved Universal Terrestrial Radio Access (E-UTRA); Physical Layer Procedures, Release 14, Mar. 2017, pp. 1-302.

* cited by examiner

TRANSMISSION BLOCK SIZE DETERMINATION

CROSS REFERENCE TO RELATED APPLICATIONS

This application is a 35 U.S.C. § 371 national stage application of PCT International Application No. PCT/SE2018/050460 filed on May 3, 2018, which in turns claims domestic priority to U.S. Provisional Patent Application No. 62/501,815, filed on May 5, 2017 and U.S. Provisional Patent Application No. 62/505,158, filed on May 12, 2017, the disclosures and content of which are incorporated by reference herein in their entirety.

TECHNICAL FIELD

The present disclosure relates to wireless communication systems and, in particular to New Radio (NR) control channels and determining transmission data block size within the communication systems.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the slot size.

Slot Structure: An NR slot consists of several orthogonal frequency-division multiplexing (OFDM) symbols, such as either 7 or 14 symbols per slot (for OFDM subcarrier spacing 60 kHz) or 14 symbols per slot (for OFDM subcarrier spacing >60 kHz). FIG. 1a shows a subframe with 14 OFDM symbols as an example. In FIG. 1a, $T_s$ and $T_{symb}$ denote the slot duration and OFDM symbol duration, respectively.

In addition to the default duration, a slot may also be shortened to accommodate a downlink/uplink (DL/UL) transient period or both DL and UL transmissions. Potential slot variations are shown in FIG. 1b, where DL symbols no represents one or more DL symbols 112, and UL symbols 120 represents one or more UL symbols. Among the UL symbols 120, the first UL symbol 122 is represented to come before the other UL symbols 124.

Furthermore, NR also defines mini-slots. Mini-slots are shorter in time than slots (according to some examples, they range from one or two symbols up to number of symbols in a slot minus one) and can start at any symbol. Mini-slots are used if the transmission duration of a slot is too long or the occurrence of the next slot start (slot alignment) is too late. Applications of mini-slots include, among others, latency critical transmissions (in this case both mini-slot length and frequent opportunity of mini-slot are important) and unlicensed spectrum where a transmission should start immediately after listen-before-talk succeeded (here the frequent opportunity of mini-slot is especially important). FIG. 1c shows an example of a mini-slot with a first and second OFDM symbol 132 (two OFDM symbols).

Latency Reduction with Short transmission time interval (TTI): Packet data latency is one of the performance metrics that vendors, operators, and end-users (via speed test applications) regularly measure. Latency measurements are done in all phases of a radio access network system lifetime, in part: when verifying a new software release or system component; when deploying a system; and when the system is in commercial operation.

Obtaining shorter latency than previous generations of the third generation partnership project (3GPP) radio access technologies (RATs) was one performance metric that guided the design of Long Term Evolution (LTE). The end-users also now recognize LTE to be a system that provides faster internet access and provides lower data latencies than previous generations of mobile radio technologies.

Packet data latency is important not only for the perceived responsiveness of the system; it is also a parameter that indirectly influences the throughput of the system. The Hypertext Transfer Protocol (HTTP) and the Transmission Control Protocol (TCP) define the dominating application and transport layer protocol suite used on the Internet today. According to the HTTP Archive, the typical size of HTTP-based transactions over the internet are in the range of a few tens of Kbyte up to 1 Mbyte. In this size range, the TCP slow-start period is a significant part of the total transport period of the packet stream. During TCP slow-start, the performance is latency limited. Hence, improved latency can rather easily be showed to improve the average throughput, for this type of TCP based data transactions.

Latency reductions could positively impact radio resource efficiency. Lower packet data latency could increase the number of transmissions possible within a certain delay bound; hence higher Block Error Rate (BLER) targets could be used for the data transmissions freeing up radio resources potentially improving the capacity of the system.

One approach to latency reduction is the reduction of transport time of data and control signaling, by addressing the length of the TTI. By reducing the length of a TTI and maintaining the bandwidth, the processing times at the transmitter and the receiver nodes are also expected to be reduced, due to less data to process within the TTI. As described in LTE release 8, a TTI corresponds to one subframe (SF) of length 1 millisecond. One such 1 ms TTI is constructed by using 14 OFDM or single carrier frequency-division multiple access (SC-FDMA) symbols in the case of normal cyclic prefix and 12 OFDM or SC-FDMA symbols in the case of extended cyclic prefix. In LTE release 14 in 3GPP, studies on latency reduction have been conducted, with the goal of specifying transmissions with shorter TTIs, such as a slot or a few symbols. A study with the goal of specifying short TTI (sTTI) started in August 2016.

An sTTI can be decided to have any duration in time and comprise resources on any number of OFDM or SC-FDMA symbols, and start at symbol position within the overall frame. For the work in LTE, the focus of the work currently is to only allow the sTTIs to start at fixed positions with durations of either two, three, four, or seven symbols. Furthermore, the sTTI is not allowed to cross either the slot or subframe boundaries.

One example shown in an illustrated example of FIG. 1d, which is an example of a 2/3-symbol sTTI configuration within an uplink subframe, where the duration of the uplink short TTI is 0.5 ms, i.e., seven SC-FDMA symbols for the case with normal cyclic prefix. Also, a combined length of two or three symbols is shown for the sTTI. Here, the "R" in the FIG. 1d indicates the Demodulation Reference Signal (DMRS) symbols, and "D" indicates the data symbols, respectively.

Control information: PDCCHs (physical downlink control channels) are used in NR systems for downlink control information (DCI), e.g., downlink scheduling assignments and uplink scheduling grants. The PDCCHs are, in general, transmitted at the beginning of a slot and relate to data in the same or a later slot (for mini-slots PDCCH can also be transmitted within a regular slot). Different formats (sizes) of the PDCCHs are possible to handle different DCI payload sizes and different aggregation levels (i.e., different code rate for a given payload size). Each user equipment (UE) is configured (implicitly and/or explicitly) to monitor (or search) for a number of PDCCH candidates of different aggregation levels and DCI payload sizes. Upon detecting a valid DCI message (i.e., the decoding of a candidate is successful and the DCI contains an identifier (ID) the UE is told to monitor) the UE follows the DCI (e.g., receives the corresponding downlink data or transmits in the uplink).

In NR systems, the introduction of a 'broadcasted control channel' to be received by multiple UEs is considered. Such a channel has been referred to as 'group common PDCCH'. One example of information that might put in such a channel is information about the slot format, i.e., whether a certain slot is uplink or downlink, which portion of a slot is UL or DL. Such information could be useful, for example, in a dynamic Time Division Duplex (TDD) system.

Transmission parameter determination: In the LTE existent protocols, the DCI carries several parameters to instruct the UE how to receive the downlink transmission or to transmit in the uplink. For example, the FDD LTE DCI format 1A carries parameters such as: a Localized/Distributed Virtual Resource Block (VRB) assignment flag; Resource block assignment; Modulation and coding scheme (MCS); Hybrid automatic repeat request (HARQ) process number; New data indicator; Redundancy version; and a Transmit Power Control (TPC) command for the Physical Uplink Control Channel (PUCCH).

One of the key parameter for the UE to be able to receive or transmit in the system is the size of the data block (called transport block size; TBS)) to be channel coded and modulated. In LTE, this is determined as follows.

The UE uses the MCS given by the DCI to read a TBS index $I_{TBS}$ from an MCS table. An example of an MCS table is shown in Table 1.

TABLE 1

LTE modulation and coding scheme

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

The UE determines the number of physical resource blocks (PRBs) as $N_{PRB}$ from the Resource block assignment given in the DCI.

The UE uses the TBS index $I_{TBS}$ and the number of PRBs $N_{PRB}$ to read the actual transport block size from a TBS table. A portion of the TBS table is shown in Table 2 as an example. The full table is provided in 3GPP TS 36.213, clause 7.1.7.2.

TABLE 2

LTE transport block size

| $I_{TBS}$ | $N_{PRB}$ | | | | | | | | |
|---|---|---|---|---|---|---|---|---|---|
| | 1 | 2 | 3 | 4 | 5 | 6 | 7 | 8 | 9 ... |
| 0 | 16 | 32 | 56 | 88 | 120 | 152 | 176 | 208 | 224 ... |
| 1 | 24 | 56 | 88 | 144 | 176 | 208 | 224 | 256 | 328 ... |
| 2 | 32 | 72 | 144 | 176 | 208 | 256 | 296 | 328 | 376 ... |
| 3 | 40 | 104 | 176 | 208 | 256 | 328 | 392 | 440 | 504 ... |
| 4 | 56 | 120 | 208 | 256 | 328 | 408 | 488 | 552 | 632 ... |
| 5 | 72 | 144 | 224 | 328 | 424 | 504 | 600 | 680 | 776 ... |
| 6 | 328 | 176 | 256 | 392 | 504 | 600 | 712 | 808 | 936 ... |
| 7 | 104 | 224 | 328 | 472 | 584 | 712 | 840 | 968 | 1096 ... |
| 8 | 120 | 256 | 392 | 536 | 680 | 808 | 968 | 1096 | 1256 ... |
| 9 | 136 | 296 | 456 | 616 | 776 | 936 | 1096 | 1256 | 1416 ... |
| 10 | 144 | 328 | 504 | 680 | 872 | 1032 | 1224 | 1384 | 1544 ... |
| 11 | 176 | 376 | 584 | 776 | 1000 | 1192 | 1384 | 1608 | 1800 ... |
| 12 | 208 | 440 | 680 | 904 | 1128 | 1352 | 1608 | 1800 | 2024 ... |
| 13 | 224 | 488 | 744 | 1000 | 1256 | 1544 | 1800 | 2024 | 2280 ... |
| 14 | 256 | 552 | 840 | 1128 | 1416 | 1736 | 1992 | 2280 | 2600 ... |
| 15 | 280 | 600 | 904 | 1224 | 1544 | 1800 | 2152 | 2472 | 2728 ... |
| 16 | 328 | 632 | 968 | 1288 | 1608 | 1928 | 2280 | 2600 | 2984 ... |
| 17 | 336 | 696 | 1064 | 1416 | 1800 | 2152 | 2536 | 2856 | 3240 ... |
| 18 | 376 | 776 | 1160 | 1544 | 1992 | 2344 | 2792 | 3112 | 3624 ... |
| 19 | 408 | 840 | 1288 | 1736 | 2152 | 2600 | 2984 | 3496 | 3880 ... |
| 20 | 440 | 904 | 1384 | 1864 | 2344 | 2792 | 3240 | 3752 | 4136 ... |

TABLE 2-continued

LTE transport block size

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | ... |
| 21 | 488 | 1000 | 1480 | 1992 | 2472 | 2984 | 3496 | 4008 | 4584 | ... |
| 22 | 520 | 1064 | 1608 | 2152 | 2664 | 3240 | 3752 | 4264 | 4776 | ... |
| 23 | 552 | 1128 | 1736 | 2280 | 2856 | 3496 | 4008 | 4584 | 5160 | ... |
| 24 | 584 | 1192 | 1800 | 2408 | 2984 | 3624 | 4264 | 4968 | 5544 | ... |
| 25 | 616 | 1256 | 1864 | 2536 | 3112 | 3752 | 4392 | 5160 | 5736 | ... |
| 26 | 712 | 1480 | 2216 | 2984 | 3752 | 4392 | 5160 | 5992 | 6712 | ... |

A similar mechanism is envisioned to be agreed for NR with the aim of providing a solution with optimal performance.

However, it might be that the above mechanism for determining the TBS yields too many options for the TBS. Hence, there is still a need for improved mechanisms for determining which TBS to use for a UE.

SUMMARY

An object of embodiments herein is thus to provide mechanisms enabling efficient determination of the TBS that do not suffer from the issues noted above, or at least where these issues are reduced or mitigated.

According to a first aspect there is presented a method in a wireless device adapted for operation in a communication network. The method comprises obtaining a pre-defined rule for computing a default transmission data block size on the basis of one or more input parameters selected from: a number of allocated physical resource blocks, a number of allocated time-domain symbols, an effective number of resource elements per physical resource block and/or symbol, a number of spatial layers, a modulation order, and a code rate.

According to a second aspect there is presented a wireless device for operation in a communication network. The wireless device comprises processor. The processor is configured to cause the wireless device to obtain a pre-defined rule for computing a default transmission data block size on the basis of one or more input parameters selected from: a number of allocated physical resource blocks, a number of allocated time-domain symbols, an effective number of resource elements per physical resource block and/or symbol, a number of spatial layers, a modulation order, and a code rate.

According to a third aspect there is presented a wireless device for operation in a communication network. The wireless device comprises an obtain module configured to obtain a pre-defined rule for computing a default transmission data block size on the basis of one or more input parameters selected from: a number of allocated physical resource blocks, a number of allocated time-domain symbols, an effective number of resource elements per physical resource block and/or symbol, a number of spatial layers, a modulation order, and a code rate.

According to a fourth aspect there is presented a computer program for operation in a communication network, the computer program comprising computer program code which, when run on processor of a wireless device, causes the wireless device to perform a method according to the first aspect.

According to a fifth aspect there is presented a method in a network node for operation in a communication network. The method comprises obtaining a pre-defined rule for computing a default transmission data block size on the basis of one or more input parameters selected from: a number of allocated physical resource blocks, a number of allocated time-domain symbols, an effective number of resource elements per physical resource block and/or symbol, a number of spatial layers, a modulation order, and a code rate.

According to a sixth aspect there is presented a network node for operation in a communication network. The network node comprises processor. The processor is configured to cause the network node to obtain a pre-defined rule for computing a default transmission data block size on the basis of one or more input parameters selected from: a number of allocated physical resource blocks, a number of allocated time-domain symbols, an effective number of resource elements per physical resource block and/or symbol, a number of spatial layers, a modulation order, and a code rate.

According to a seventh aspect there is presented a network node for operation in a communication network. The network node comprises an obtain module configured to obtain a pre-defined rule for computing a default transmission data block size on the basis of one or more input parameters selected from: a number of allocated physical resource blocks, a number of allocated time-domain symbols, an effective number of resource elements per physical resource block and/or symbol, a number of spatial layers, a modulation order, and a code rate.

According to an eight aspect there is presented a computer program for operation in a communication network, the computer program comprising computer program code which, when run on processor of a network node, causes the network node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these wireless devices, these network nodes, and these computer programs provide efficient determination of the transport block size.

Advantageously these methods, these wireless devices, these network nodes, and these computer programs do not suffer from the issues noted above.

Advantageously these methods, these wireless devices, these network nodes, and these computer programs reduce the number of possible transport block sizes.

Advantageously these methods, these wireless devices, these network nodes, and these computer programs support specific service data block sizes to enhance system performance.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Figure 1A:
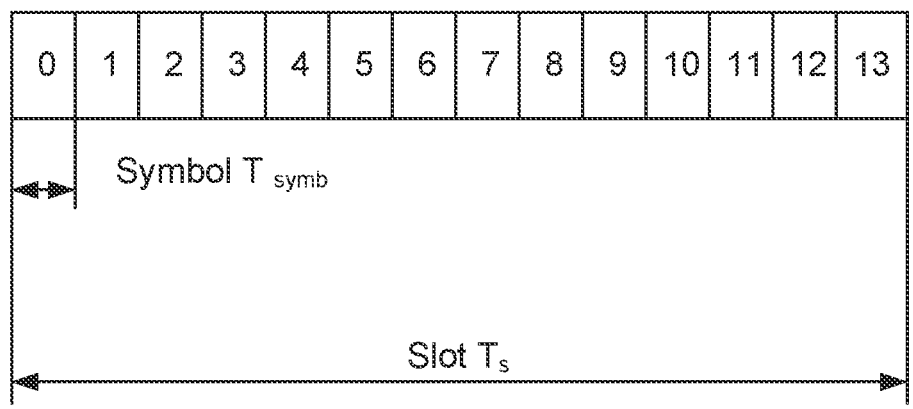
FIG. 1a schematically illustrates an example of a slot according to an NR system.
Figure 1B:
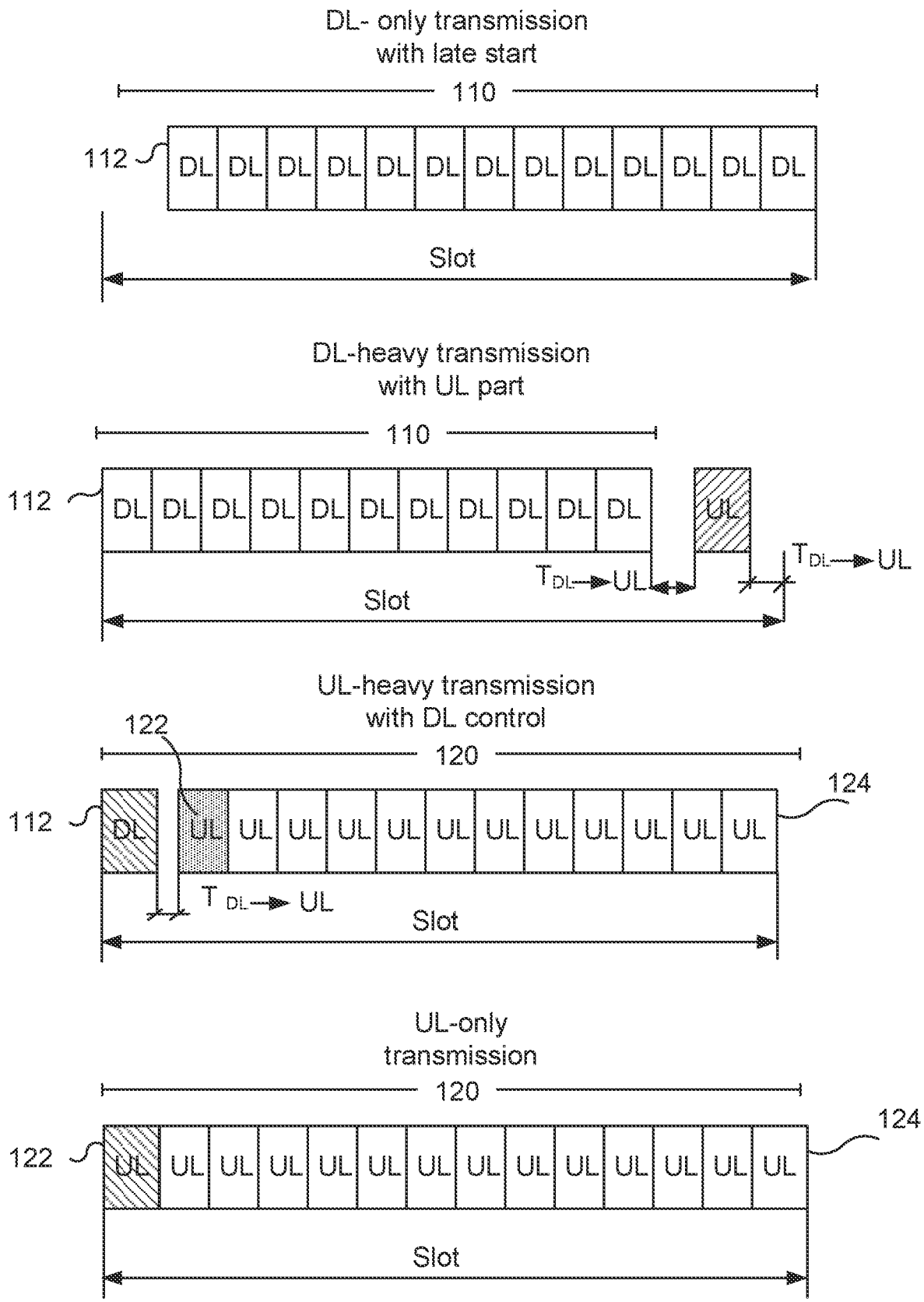
FIG. 1b schematically illustrates an example of slot variations according to an NR system.
Figure 1C:
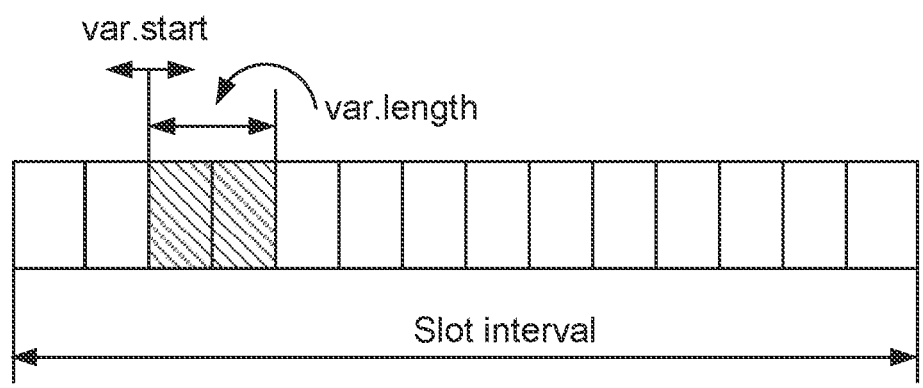
FIG. 1c schematically illustrates an example of a mini-slot with two OFDM symbols according to an NR system.
Figure 1D:
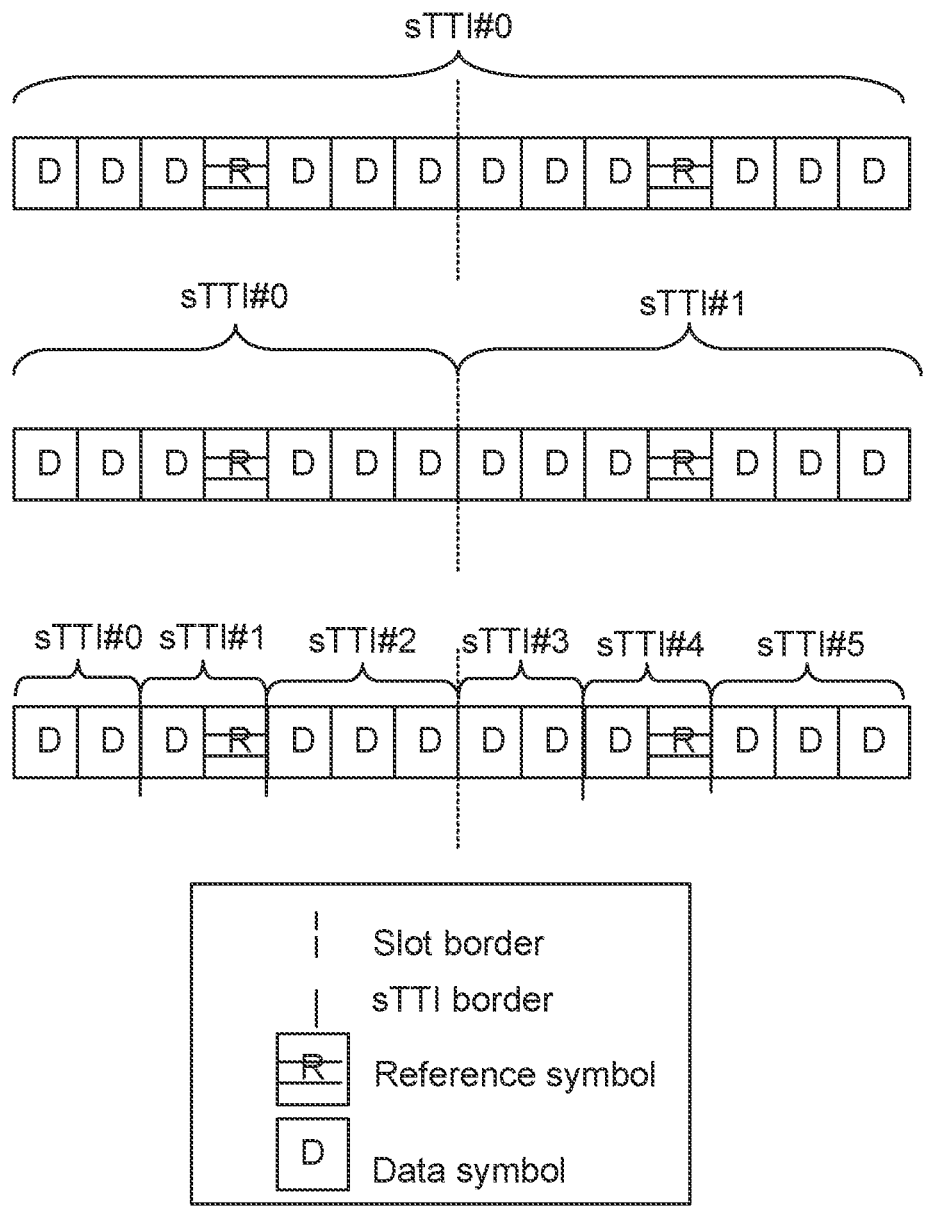
FIG. 1d schematically illustrates an example of a 2/3-symbol sTTI configuration within an uplink subframe according to an NR system.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network or a gNB in a 3GPP New Radio (NR) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like.

Network Node: As used herein, a "network node" is any node that is either part of the radio access network or the core network of a cellular communications network/system.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

In the present application, the terms UE (User Equipment), terminal, mobile station, handset, wireless device, etc., are used interchangeably to denote a device that communicates with a wireless infrastructure, e.g., network equipment such as base stations, gNB, eNB, and the like. The term should not be construed as to mean any specific type of device, it applies to them all, and the solutions described here are applicable to all devices that use methods according embodiments of the present disclosure. Similarly, a base-station is intended to denote the node in the wireless infrastructure that communicates with the UE. Different names may be applicable, and the functionality of the base-station may be distributed in various ways. For example, there could be a radio head terminating or implementing (carrying out) parts of the radio protocols and a centralized unit that implements (or carries out) other parts of the radio protocols. We will not distinguish such implementations here, instead the term base-station will refer to all alternative architectures that can implement (or may be operable to carry out) some embodiments according to the present disclosure.

In 3GPP, there are studies on new protocols collectively referred to as new radio (NR) interface for fifth generation (5G) telecommunication systems. Various terms are used in the art for this new and next generation technology. The terms NR and 5G are used in the present disclosure interchangeably. Moreover, a base-station can be referred to as gNB instead of eNB. Alternatively, the term Transmission-Receive-point (TRP) can also be used.

The embodiments set forth below represent information to enable those skilled in the art to practice the embodiments and illustrate the best mode of practicing the embodiments. Upon reading the following description in light of the accompanying Figures, those skilled in the art will understand the concepts of the disclosure and will recognize applications of these concepts not particularly addressed herein. It should be understood that these concepts and applications fall within the scope of the disclosure.

The description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

In the description herein, reference may be made to the term "cell;" however, particularly with respect to 5G, or NR, concepts, beams may be used instead of cells and, as such, it is important to note that the concepts described herein are equally applicable to both cells and beams. Throughout the disclosure, 'DL/UL transmission' refers to a communication link with a transmitter from one radio node and a receiver at another radio node. In legacy cellular system, the functions of network node and UE node are not symmetric, therefore there is a DL and a UL. For sidelink communication, two nodes (often both are UEs) are symmetric by function. 'Sidelink transmission (or communication)' also refers to a communication link with a transmitter from one node and a receiver at another node.

Embodiments of the present disclosure determining transmission data block size potentially allow an easier evolution or changes of the system and/or improved performance.

Figure 2:
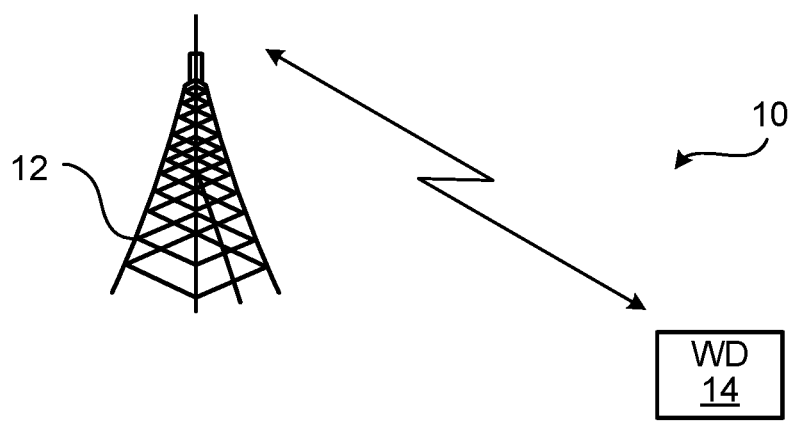
FIG. 2 illustrates one example of a wireless communications system in which embodiments of the present disclosure may be implemented.

FIG. 2 illustrates one example of a wireless communications system 10 (e.g., a cellular network) in which embodiments of the present disclosure may be implemented. As illustrated, the wireless communications system 10 includes a radio access node 12 that provides wireless, or radio, access to a wireless device 14. The radio access node, or base station, is connected to a core network (CN, not shown). In some embodiments, the wireless communications system 10 is a 3GPP LTE network in which case the radio access node 12 may be an eNB (and thus referred to herein as an eNB 12). In some other embodiments, the wireless communications system 10 is a 3GPP NR network in which case the radio access node 12 may be a gNB (and thus referred to therein as a gNB 12). Notably, for the following description, the radio access node 12 is an eNB 12 and the wireless device 14 is a UE (and thus referred to herein as a UE 14); however, the present disclosure is not limited thereto.

In the present disclosure, the generic term transmission data block size (TDBS) is used. Such transmission data block size (TDBS) may correspond to the transport block size (TBS) as used in current LTE specifications. Such transmission data block size (TDBS) may also correspond to different protocol definitions and different aggregation of radio resource units. Non-limiting examples of radio resource units include OFDM symbols, spatial layers, bandwidth parts and carriers. The term PRB (Physical Resource Block) is also used as a generic term to refer to resource allocation unit in a system operating based on various protocols, not only based on current LTE specifications. It will be clear to one skilled in the art to apply the teaching to these different definitions or aggregation variations.

In terms of the transmission data block size, certain services are expected to generate large number of packages in the system. For instance, voice over IP (VoIP) service can represent one main application case s. Possible sizes from the VoIP service include, for instance, 144, 176, 208, 224, 256, and 328 bits. The VoIP services generate a large number of packets, each of which with specific sizes. It becomes beneficial for the system to handle these specific packet sizes specifically to optimize performance of the system and the specific services.

Earlier disclosed methods for determining the transmission data block size do not address these specific service packet sizes directly. For instance, assuming MCS table as given in Table 4 and $N_{RE}^{DL,PRB}=120$ and $v=1$, the transmission data block sizes for the first few MCS levels and $N_{PRB}$ allocation sizes are given in Table 3.

TABLE 3

Exemplary transmission data block sizes for the first few MCS levels and for $N_{PRB} \leq 10$.

| $I_{MCS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 32 | 64 | 88 | 120 | 144 | 176 | 200 | 232 | 256 | 288 |
| 1 | 40 | 80 | 112 | 152 | 184 | 224 | 264 | 296 | 336 | 368 |
| 2 | 48 | 96 | 136 | 184 | 232 | 272 | 320 | 368 | 408 | 456 |
| 3 | 64 | 120 | 184 | 240 | 296 | 360 | 416 | 472 | 536 | 592 |
| 4 | 80 | 152 | 224 | 296 | 368 | 440 | 512 | 584 | 656 | 728 |
| 5 | 96 | 184 | 272 | 360 | 448 | 536 | 624 | 712 | 800 | 896 |
| 6 | 112 | 216 | 320 | 424 | 528 | 632 | 744 | 848 | 952 | 1056 |
| 7 | 128 | 248 | 376 | 496 | 624 | 744 | 864 | 992 | 1112 | 1240 |
| 8 | 144 | 288 | 424 | 568 | 712 | 848 | 992 | 1136 | 1272 | 1416 |
| 9 | 160 | 320 | 480 | 640 | 800 | 960 | 1120 | 1280 | 1440 | 1592 |
| 10 | 160 | 320 | 480 | 640 | 800 | 960 | 1120 | 1280 | 1440 | 1600 |
| 11 | 184 | 360 | 536 | 712 | 888 | 1064 | 1248 | 1424 | 1600 | 1776 |
| 12 | 208 | 408 | 616 | 816 | 1024 | 1224 | 1432 | 1632 | 1832 | 2040 |
| 13 | 232 | 464 | 696 | 920 | 1152 | 1384 | 1608 | 1840 | 2072 | 2304 |
| 14 | 264 | 520 | 784 | 1040 | 1304 | 1560 | 1816 | 2080 | 2336 | 2600 |
| 15 | 296 | 584 | 872 | 1160 | 1448 | 1736 | 2024 | 2312 | 2600 | 2888 |
| 16 | 312 | 624 | 928 | 1240 | 1544 | 1856 | 2160 | 2472 | 2776 | 3088 |
| 17 | 312 | 616 | 928 | 1232 | 1544 | 1848 | 2160 | 2464 | 2776 | 3080 |
| 18 | 328 | 656 | 984 | 1312 | 1640 | 1968 | 2296 | 2624 | 2952 | 3280 |
| 19 | 368 | 728 | 1096 | 1456 | 1824 | 2184 | 2552 | 2912 | 3272 | 3640 |
| . | . | . | . | . | . | . | . | . | . | . |
| . | . | . | . | . | . | . | . | . | . | . |
| . | . | . | . | . | . | . | . | . | . | . |

It can be observed that these transmission data block sizes match the VoIP service packet sizes infrequently. As a result, two undesirable cases can happen.

As an example for the first case, the block size of 328 occurs only with $I_{MCS}=18$ and $N_{PRB}=1$. This MCS level requires 64 quadrature amplitude modulation (QAM) and, hence, is operable only at high signal-to-noise ratio (SNR) situations. Communication link performance will be degraded if the nodes send data of this sizes without the required SNR.

Alternatively, the sender of the packet can pad zero bits to make a data block of size that meets the current link quality. For instance, if the current link quality allows reliable communications using $I_{MCS}=4$, the sender can pad the 328-bit packet up to 368 bits. The sender can then use $I_{MCS}=4$ and $N_{PRB}=5$ to send the padded data block. Since the data contains padding bits (which carries no useful information), the link performance is not optimal.

For certain channel coding schemes, only a limited number of transmission data block sizes are allowed in the system. For instance, only 237 transport block sizes are allowed for the turbo coding schemes in Rel-14 of LTE (see, 3GPP TS 36.213 v 14.2.0). Earlier disclosed methods for determining the transmission data block size will not always match those specifically allowed sizes. The same issue can also occur with other channel coding methods, and hence this is not limited to turbo coding. Other coding methods that could be considered for the TBSs are Polar codes, low density parity check (LDPC) codes, and convolutional codes. The issue rather is, in some aspects, more linked to the use of a fixed TBS table. Some channel codes or radio interfaces may have a stronger need for the aforementioned than others.

Figure 3A:
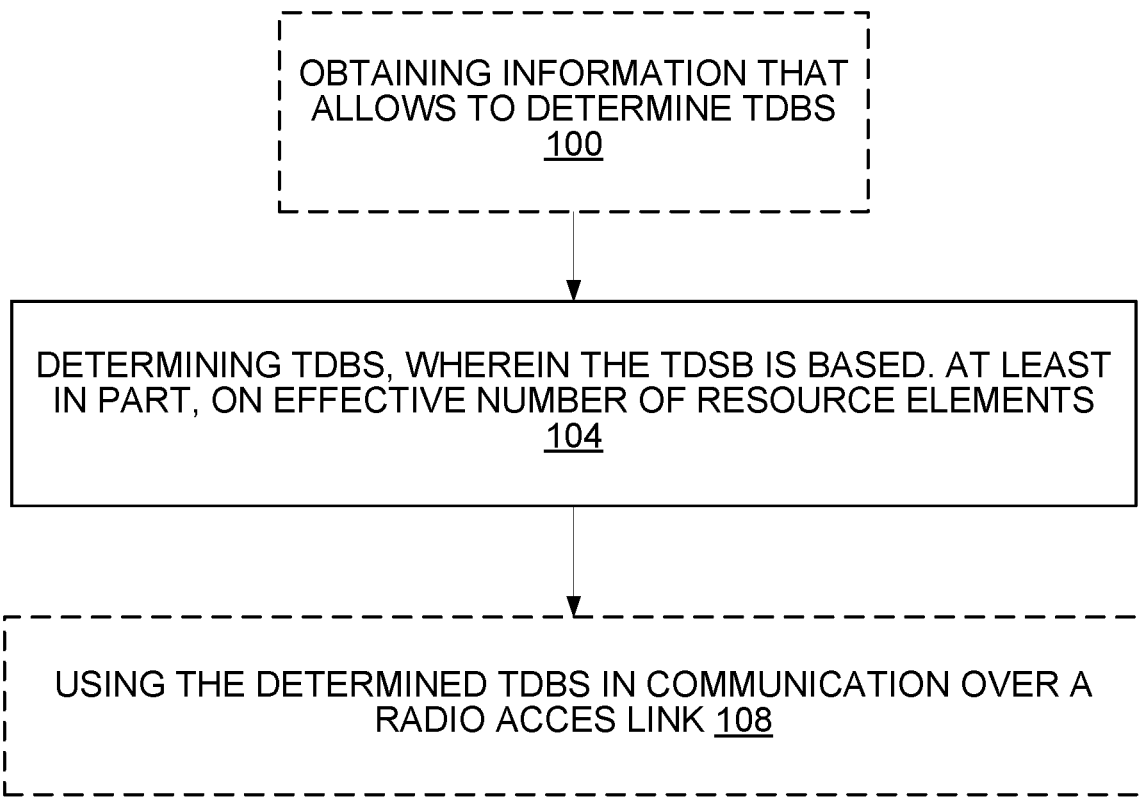
FIGS. 3(a) and 3(b) are flow charts that illustrate the operation of a radio node according to some embodiments of the present disclosure.
Figure 3B:
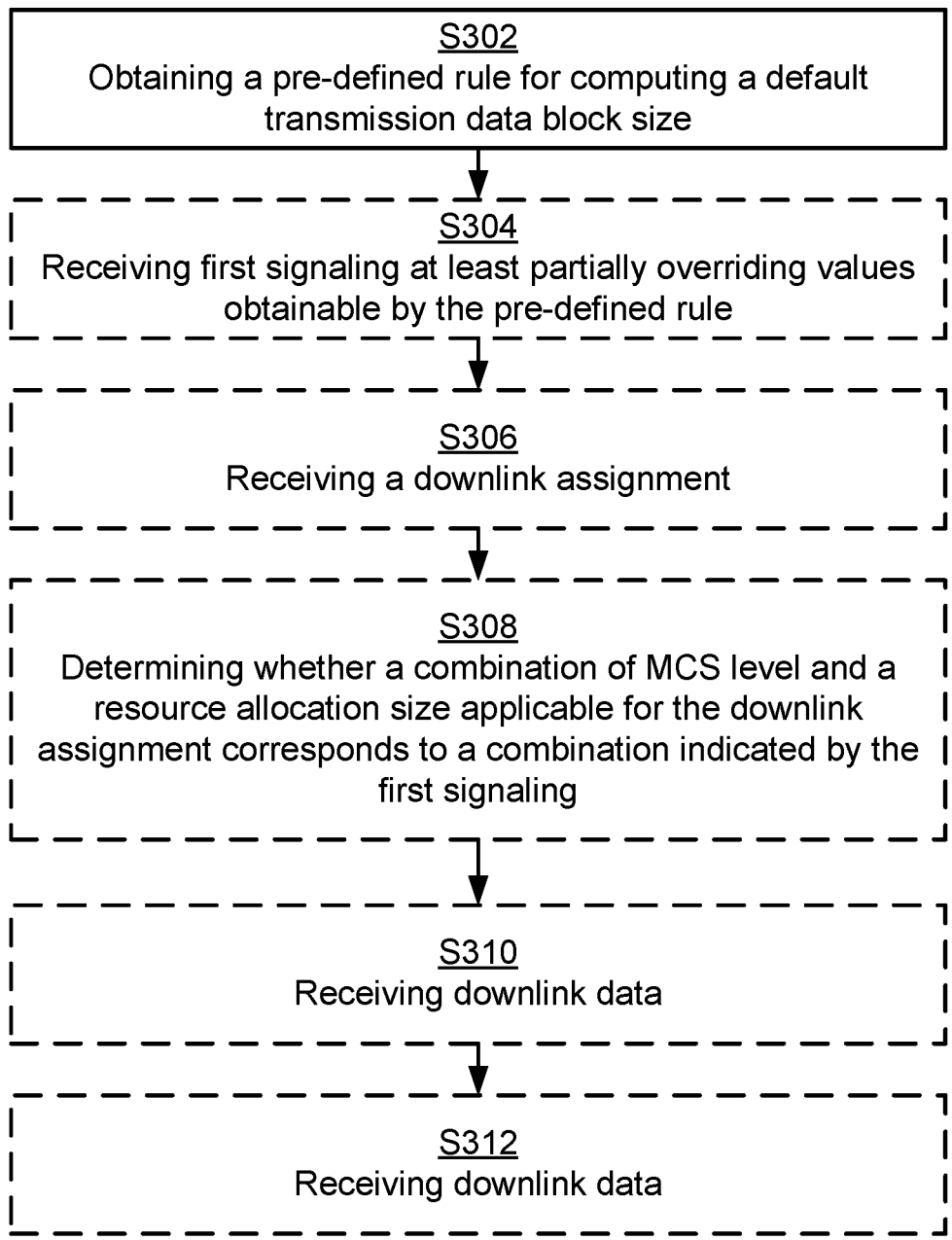

A flow chart illustrating a method for a radio node according to embodiments of one aspect of the disclosure is illustrated in FIG. 3(a). The method is for a radio node, for example wireless device 14. The method comprises the following steps:

Step 100 (optional): OBTAINING INFORMATION (Pre-defined Rule) THAT ALLOWS TO DETERMINE TDBS Step 104: DETERMINING TDBS from the Pre-defined Rule, WHEREIN THE TDSB IS BASED, AT LEAST IN PART, ON AN EFFECTIVE NUMBER OF RESOURCE ELEMENTS, $N_{RE}$ Step 108 (optional): USING THE DETERMINED TDBS IN COMMUNICATION OVER A RADIO ACCESS LINK A flow chart illustrating a method for a radio node according to embodiments of one aspect of the disclosure is illustrated in FIG. 3(b). The method is for a radio node, for example wireless device 14. The method comprises the following steps:

S302: obtaining a pre-defined rule for computing a default transmission data block size on the basis of one or more input parameters selected from: a number of allocated physical resource blocks, a number of allocated time-domain symbols, an effective number of resource elements per physical resource block and/or symbol, a number of spatial layers, a modulation order, and a code rate.

S304 (optional): receiving first signaling at least partially overriding values obtainable by the pre-defined rule.

S306 (optional): receiving a downlink assignment.

S308 (optional): determining whether a combination of MCS level and a resource allocation size applicable for the downlink assignment corresponds to a combination indicated by the first signaling.

S310 (optional): responsive to a positive outcome of the determination, receiving downlink data in accordance with the downlink assignment applying a transmission data block size indicated by the first signaling.

S312 (optional): receiving downlink data from a node of the communication network while applying a transmission data block size in accordance with the first signaling.

Figure 4A:
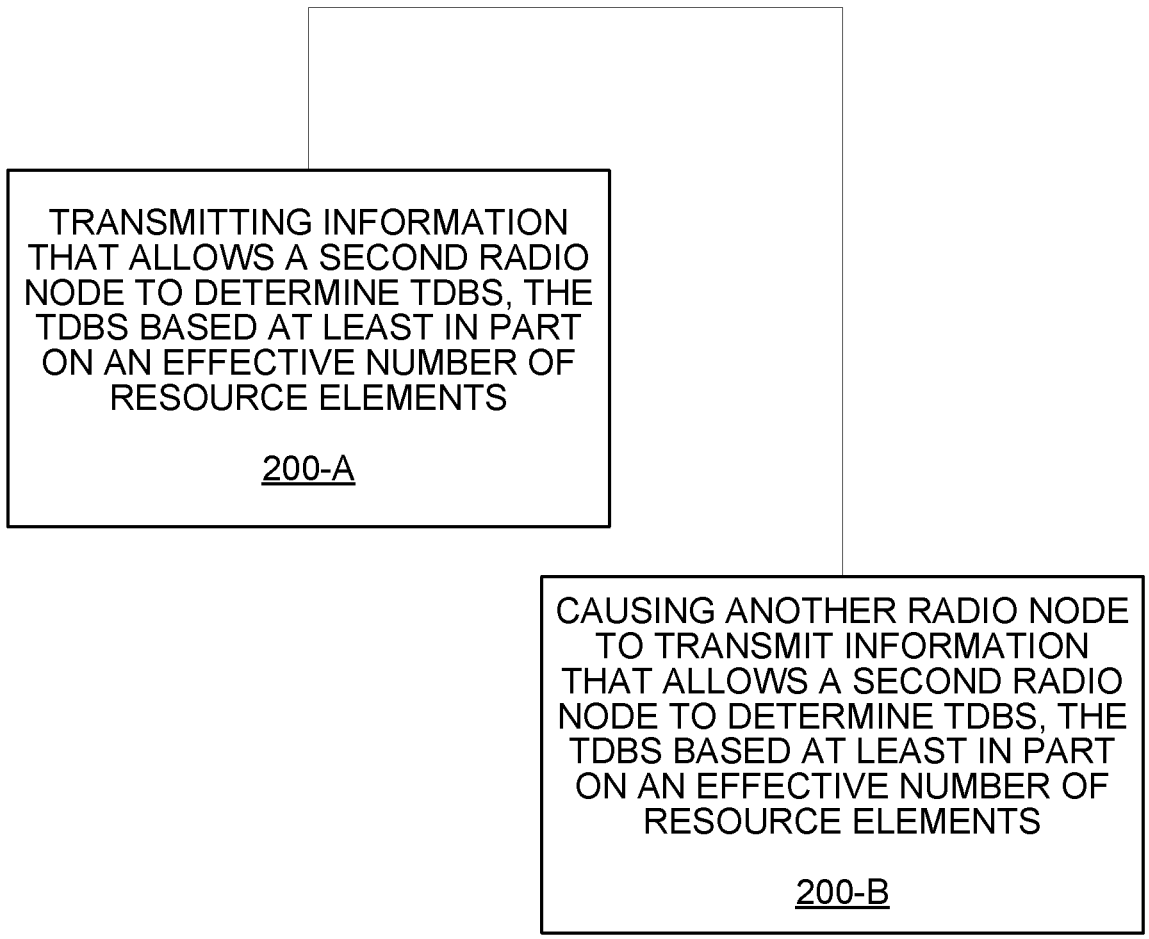
FIGS. 4(a) and 4(b) are flow charts that illustrate the operation of a radio node according to other embodiments of the present disclosure.

A flow chart illustrating a method for a radio node according to embodiments of another aspect of the disclosure is illustrated in FIG. 4(a). The method is for a radio node, for example network node 11. The method comprises the following steps:

STEP 200-A: TRANSMITTING INFORMATION (Pre-defined Rule) THAT ALLOWS A SECOND RADIO NODE TO DETERMINE TDBS, THE TDBS BASED AT LEAST IN PART ON AN EFFECTIVE NUMBER OF RESOURCE ELEMENTS; AND/OR STEP 200-B: CAUSING ANOTHER RADIO NODE TO TRANSMIT INFORMATION THAT ALLOWS A SECOND RADIO NODE TO DETERMINE TDBS, THE TDBS BASED AT LEAST IN PART ON AN EFFECTIVE NUMBER OF RESOURCE ELEMENTS Steps 200A and 200-B, may both be performed, or only one may be performed. If both are performed, the information transmitted in each step may be complementary.

Figure 4B:
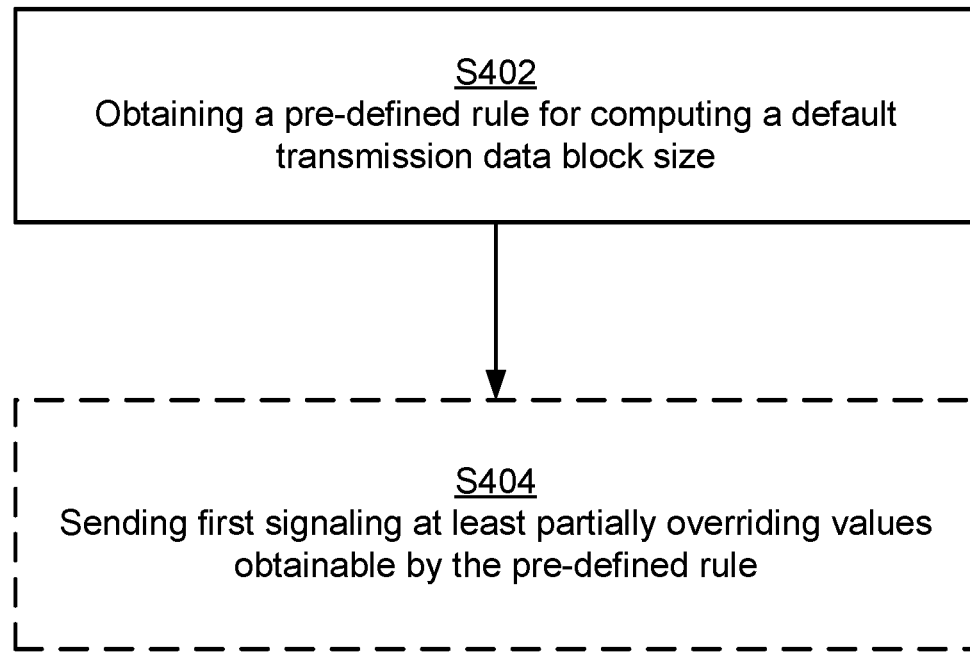

A flow chart illustrating a method for a radio node according to embodiments of another aspect of the disclosure is illustrated in FIG. 4(b). The method is for a radio node, for example network node 11. The method comprises the following steps:

S402: obtaining a pre-defined rule for computing a default transmission data block size on the basis of one or more input parameters selected from: a number of allocated physical resource blocks, a number of allocated time-domain symbols, an effective number of resource elements per physical resource block and/or symbol, a number of spatial layers, a modulation order, and a code rate.

S404 (optional): sending first signaling at least partially overriding values obtainable by the pre-defined rule.

Further embodiments, which may be used on their own or in combination with the methods in FIGS. 3 and 4, are described in the following.

Determination using the effective number of resource elements per PRB: In one aspect of the present disclosure, in a method (A) for a radio node such as a UE, the transmission data block size is determined using the effective number of resource elements per PRB. Throughout the present disclosure, PRB is used as the frequency domain unit of resource allocation, and has no limitation of the resource allocated in time domain.

According to one embodiment of this aspect, the radio node (e.g., a UE) determines the transmission data block size based on a modulation order $Q_m$, a code rate r, the number of spatial layers v, the allocated number of PRBs $N_{PRB}$ and an effective number of resource elements per PRB $N_{RE}$.

In another, non-limiting embodiment, the transmission data block size is given by:

$$N_{PRB} \cdot N_{RE} \cdot v \cdot Q_m \cdot r,$$

where $N_{PRB}$ represents allocated number of physical resource blocks, where $N_{RE}$ represents the effective number of resource elements per physical resource block, where v represents number of spatial layers, where $Q_m$ represents modulation order, and where r represents code rate. According to an embodiment the pre-defined rule for computing the transmission data block size comprises a factor given by this equation. According to an embodiment the pre-defined rule specifies the transmission data block size to be aligned with byte size.

In still another, non-limiting embodiment, the transmission data block size is adjusted to be aligned with a specific size unit C:

$$C \cdot \left\lceil \frac{N_{PRB} \cdot N_{RE} \cdot v \cdot Q_m \cdot r}{C} \right\rceil,$$

where $\lceil x \rceil$ is ceiling function giving the smallest integer no smaller than x. According to an embodiment the pre-defined rule for computing the transmission data block size is given by this equation.

One non-limiting example is C=8 such that the transmission data block size is adjusted to be aligned with byte size:

$$8 \cdot \left\lceil \frac{N_{PRB} \cdot N_{RE} \cdot v \cdot Q_m \cdot r}{8} \right\rceil$$

Different settings of C allow the transmission data block size to be adjusted to satisfy different constraints. For example, in LTE, a transport block may be sub-divided into multiple code blocks with constraint that all code blocks are of equal size. The same may be applicable to other protocols.

In one embodiment, the parameters that are used to derive the transmission data block size may be known to both the transmitter and the receiver of a radio access link. In one embodiment, the parameters (or parameter values, or information related to the parameters) may be signaled between the transmitter and receiver either semi-statically, i.e., via higher layer signaling, or dynamically such as via physical control information (e.g., downlink control information (DCI)). The signaling of parameter values can be implicit (e.g., via other parameters) or explicit (e.g., as standalone parameters). While other variations are possible, one embodiment is described below.

Together the modulation order $Q_m$ and code rate r are signaled dynamically via DCI, and are provided by one DCI field called MCS. This is described with further details below.

The number of spatial layers v is provided by a DCI field, e.g., with the related MIMO scheme configured semi-statically via higher layer signaling.

The number of allocated PRBs $N_{PRB}$ is signaled dynamically by a DCI field, or implied by PRB allocation which is also signal dynamically by a DCI field.

The effective number of resource elements per PRB $N_{RE}$ can be provided in multiple ways as described below. Further details are provided below.

Implicitly via other configuration parameters. For example, the effective number of resource elements per PRB can be determined by various configurations, including: the slot configuration (including mini-slot), FDD vs TDD, control region configuration, the reference symbol configuration etc. In this case, no signaling of $N_{RE}$ is necessary. In some embodiments, the implicitly derived value can also be considered the default value, which can be overwritten by an explicitly signaled value.

Explicitly via higher layer signaling. This is semi-static configuration of $N_{RE}$. For example, the gNB can select a value of $N_{RE}$ from a set of predefined values of $N_{RE}$, and then send the selected value of $N_{RE}$ to the radio node (e.g., a UE) during RRC configuration or reconfiguration. The selected value of $N_{RE}$ is assumed by both transmitter and receiver for all subsequent transmission until a new value is signaled via higher layer signaling.

Explicitly via DCI. This is dynamic configuration of $N_{RE}$. For example, the gNB can select a value of $N_{RE}$ from a set of predefined values of $N_{RE}$, and then send the selected value to the UE via a DCI field. In some embodiments, the DCI signaled value is only used for the data transmission related to the DCI, not all subsequent transmission. For DCI providing information for a single data transmission, the value of $N_{RE}$ may be used for the single data transmission only. For DCI providing information of semi-persistent data transmission, the value of $N_{RE}$ may be used for the multiple data transmission in the semi-persistent configuration.

A combination of above methods. For example, explicitly via a combination of higher layer signaling and DCI signaling. This uses a combination of semi-static configuration and dynamic configuration of $N_{RE}$. A higher layer signaling could be a base value, while an offset from the base value could be signaled by the DCI.

In general, aspects and embodiments of the present disclosure are applicable for any radio access link between a transmitter and a receiver of two different radio nodes, respectively, including downlink data transmission, uplink data transmission and side-link communication. For parameter $N_{RE}$, according to some embodiments, there may be one for downlink communication and another one for uplink communication. For example, one parameter $N_{RE}^{DL,PRB}$ is defined for downlink data transmission, while another parameter $N_{RE}^{UL,PRB}$ is defined for u plink data transmission. Typically $N_{RE}^{DL,PRB}$ and $N_{RE}^{UL,PRB}$ take independent and different values.

Furthermore, yet another parameter can be defined for sidelink. In this case, two peer devices can share a single sidelink parameter $N_{RE}^{SL,PRB}$.

For HARQ transmission and retransmission of a same data block (e.g., transport block, TB), the block size may have to be kept the same, even when:

DCI of a transmission or retransmission is not received correctly, including the initial transmission;

HARQ-ACK response (where ACK is short for acknowledgement) to a transmission or retransmission is not received correctly, including the initial transmission;

Time and or frequency resource configuration changes between the (re-) transmissions of a same data block.

Hence, the base station may have to make sure that when considering the aggregated effect of all parameters, the data block size (TDBS) obtained by embodiments of above method stays the same for a given transport block, even if individual parameter value may change.

Signaling of MCS: One feature of some embodiments of the present disclosure presents that a radio node (e.g., a UE) uses an MCS index $I_{MCS}$ to determine the modulation order $Q_m$ and code rate r. In one exemplary embodiment, the radio node (e.g., a UE) reads said modulation order $Q_m$ and code rate r from an MCS table using said MCS index $I_{MCS}$. A non-limiting example of the MCS table is shown in Table 4.

TABLE 4

MCS table

| MCS index $I_{MCS}$ | Modulation order $Q_m$ | Code rate r × 1024 |
|---|---|---|
| 0 | 2 | 120 |
| 1 | 2 | 157 |
| 2 | 2 | 193 |
| 3 | 2 | 251 |
| 4 | 2 | 308 |
| 5 | 2 | 379 |
| 6 | 2 | 449 |
| 7 | 2 | 526 |
| 8 | 2 | 602 |
| 9 | 2 | 679 |
| 10 | 4 | 340 |
| 11 | 4 | 378 |
| 12 | 4 | 434 |
| 13 | 4 | 490 |
| 14 | 4 | 553 |
| 15 | 4 | 616 |
| 16 | 4 | 658 |
| 17 | 6 | 438 |
| 18 | 6 | 466 |

TABLE 4-continued

MCS table

| MCS index $I_{MCS}$ | Modulation order $Q_m$ | Code rate r × 1024 |
|---|---|---|
| 19 | 6 | 517 |
| 20 | 6 | 567 |
| 21 | 6 | 616 |
| 22 | 6 | 666 |
| 23 | 6 | 719 |
| 24 | 6 | 772 |
| 25 | 6 | 822 |
| 26 | 6 | 873 |
| 27 | 6 | 910 |
| 28 | 6 | 948 |

Multiple MCS tables can be defined in the NR system. For example, Downlink and uplink may have different MCS tables; OFDM and DFT-SOFDM based transmission may use different MCS tables; or Different radio node (e.g., UE) categories may use different MCS tables. For example, low-cost UEs (e.g., MTC UE, NB-IoT UEs) may use different MCS tables.

Aspects of Signaling of the effective number of resource elements per PRB $N_{RE}$ will now be disclosed.

A further feature in some embodiments according to the present disclosure is that the effective number of resource elements per PRB $N_{RE}$ is semi-statically configured by the network via higher layer signaling system. This effective number of resource elements per PRB $N_{RE}$ can be included in the system information block transmission or broadcast. This effective number of resource elements per PRB $N_{RE}$ can be configured by higher protocols such as the radio resource control (RRC) layer protocol.

Yet another feature of some embodiments according to the present disclosure is that the network, via higher layer signaling, semi-statically configures a set of values for the effective number of resource elements per PRB $N_{RE}$. An index may be included in the downlink control information (DCI) to indicate the $N_{RE}$ value that the radio node (e.g., UE) should apply to the corresponding transmission or reception. In one non-limiting example, two $N_{RE}$ values are semi-statically configured and a 1-bit index is included in the DCI to select the applicable $N_{RE}$ value. In another non-limiting example, four $N_{RE}$ values are semi-statically configured and a 2-bit index is included in the DCI to select the applicable $N_{RE}$ value.

In a further embodiment, the effective one or multiple numbers of resource elements per PRB $N_{RE}$ are provided in the DCI.

Examples for calculating the effective number of resource elements per PRB $N_{RE}$ will now be disclosed.

One example of calculating $N_{RE}$ for DL, $N_{RE}^{DL,PRB}$, is:

$$N_{RE}^{DL,PRB} = 12 \cdot n_{OFDM} - N_{RE}^{PTRS}.$$

Here, $n_{OFDM}$ is the number of OFDM symbols used for data transmission. Typical value of $n_{OFDM}$ for a slot is $n_{OFDM}=5$ or $n_{OFDM}=12$, where 2 OFDM symbols are excluded for DL control and DMRS. Lower values of $n_{OFDM}$ is expected when mini-slot is used for data transmission. Here, $N_{RE}^{PTRS}$ is the average number of resource elements per PRB used for the Phase Tracking Reference Signal (PTRS). In the above, "12" refers to the existence of twelve subcarriers in a PRB.

Aspects of determination using the effective number of resource elements per time-domain symbol per PRB will now be disclosed.

In another embodiment, in a method (B) for a radio node (e.g., either a UE or a base station), the transmission data block size is determined using the effective number of resource elements per time-domain symbol per PRB. The time-domain symbol can be either OFDM symbol or DFT-SC-OFDM symbol, where DFT is short for Discrete Fourier Transform, and SC is short for single carrier.

The UE determine the transmission data block size based on a modulation order $Q_m$, a code rate r, the number of spatial layers v, the allocated number of PRBs $N_{PRB}$, the number of allocated time-domain symbols (OFDM symbols or DFT-SOFDM symbols) $N_{symb}$, and an effective number of resource elements per OFDM symbol (or DFT-SC-OFDM symbol) per PRB $N_{RE}^{symb}$.

In one non-limiting embodiment, the transmission data block size is given by:

$$N_{PRB} \cdot N_{symb} \cdot N_{RE}^{symb} \cdot v \cdot Q_m \cdot r.$$

In another non-limiting embodiment, the transmission data block size is adjusted to be aligned with a specific size unit C:

$$C \cdot \left\lceil \frac{N_{PRB} \cdot N_{symb} \cdot N_{RE}^{symb} \cdot v \cdot Q_m \cdot r}{C} \right\rceil,$$

where $\lceil x \rceil$ is ceiling function giving the smallest integer no smaller than x. One non-limiting example is C=8 such that the transmission data block size is adjusted to be aligned with byte size:

$$8 \cdot \left\lceil \frac{N_{PRB} \cdot N_{symb} \cdot N_{RE}^{symb} \cdot v \cdot Q_m \cdot r}{8} \right\rceil.$$

Different settings of C allow the transmission data block size to be adjusted to satisfy different constraints. For example, currently in LTE, a transport block may be subdivided into multiple code blocks with constraint that all code blocks are of equal size.

Similar to some embodiments of the method (A), the parameters that are used to derive the transmission data block size are known to both the transmitter and the receiver. The knowledge about the parameter values is signaled between the transmitter and receiver either semi-statically via higher layer signaling, or dynamically via downlink control information (DCI). The signaling of parameter value can be implicit or explicit.

Similar to some embodiments of the method (A), the base station has to make sure that when considering the aggregated effect of all parameters, the data block size obtained by above method stays the same for a given transport block, even if individual parameter value may change.

An example for calculating the number of allocated time-domain symbols $N_{symb}$ is shown below. For DL transmission, the resource allocation in time domain is given by: the length in number of slots of the resource allocation, $n_{DataSlots}$, the first OFDM symbol in the first slot of the corresponding PDSCH, $l_{DataStart}$, the last OFDM symbol in the last slot of the corresponding PDSCH, $l_{DataStop}$.

$N_{symb}$=#symbols_per_slot*#slots−#symbols_lost_at_start−#symbols_lost_at_end. That is:

$$N_{symb} = N_{symb}^{(n_{sc})} n_{DataSlots} - l_{DataStart} - (N_{symb}^{(n_{sc})} - l_{DataStop} - 1)$$

$$= N_{symb}^{(n_{sc})}(n_{DataSlots} - 1) + l_{DataStop} - l_{DataStart} + 1$$

Examples of $N_{RE}^{symb}$ values:

If all REs in a time domain symbol per PRB is used for data transmission, then $N_{RE}^{symb}=12$.

If on average, d REs cannot be used for data transmission in a time domain symbol per PRB, then $N_{RE}^{symb}=12-d$.

In some aspects, the first signaling limits the transmission data block size to 144, 176, 208, 224, 256, or 328 bits.

Five specific embodiments based on at least some of the above embodiments will now be disclosed.

Embodiment 1

In a first embodiment, earlier disclosed methods, for example as taught in U.S. Ser. No. 62/473,839, are first practiced to determine a transmission data block size as a temporary transmission data block size. The largest transmission data block size from the allowed transmission data block size list that is not greater than the temporary transmission data block size is selected as the transmission data block size.

As a non-limiting example of the embodiment, a temporary transmission data block size of 2500 is determined based on:

$$8 \cdot \left\lceil \frac{N_{PRB} \cdot N_{RE} \cdot v \cdot Q_m \cdot r}{8} \right\rceil$$

It can be checked from the allowed transport block sizes for LTE turbo coding that 2472 is the largest allowed size that is not greater than 2500. According to the teaching, the transmission data block size (which is the transport block size for this LTE example) is set to 2472. It is noted that this is purely an example based on the LTE turbo code. The same TBS sizes or a TBS table may further be defined also for other coding methods such as LDPC codes, Polar codes and Convolutional codes.

Embodiment 2

In a second embodiment the scaling to the TBS table by the above formula only applies to DCI messages located in a specific search space, CORESET or RNTI scrambling. The search space could for example be the UE specific search space. While if the DCI message is found in another search space for example the common search space a fixed TBS table may apply. That is, according to an embodiment, whether to limit the transmission data block size by partially overriding values obtainable by the pre-defined rule depends on in which search space the DCI message is located.

In other aspects of this embodiment, a bit in the DCI message signals whether a fix TBS table is directly applied or the code rate scaling formula given in embodiment 1 is applied. That is, according to an embodiment, whether to use the look-up table, the specification, or the formula depends on a bit in the DCI message. In some aspects the formula according to which the first signaling limits the transmission data block size to a formula given by:

$$C \cdot \left\lceil \frac{N_{PRB} \cdot N_{RE} \cdot v \cdot Q_m \cdot r}{C} \right\rceil,$$

where $\lceil x \rceil$ is the ceiling function, giving the smallest integer no smaller than x, and C is a positive integer representing a size unit. As above, in an example C=8.

The configuration of the usage of embodiment 1 may further for the given use cases by RRC signaling or it may directly follow based on the operation mode the UE is in.

Another possibility is that the UE is operating with shorter transmission durations in LTE sometimes referred to as sTTI or alternatively shorter processing time and it follows the scheme in embodiment 1 applies.

Embodiment 3

For smaller packed sizes for example corresponding to VoIP packages (could also be other smaller packages sizes) as given in the background information. The embodiment 1 does not apply and these TBS can directly be selected with some other method as given in, for example, U.S. Ser. No. 62/501,815.

Embodiment 4

In a fourth embodiment, the transmission data block sizes of selected combination of MCS level and resource allocation size are over-written with specific values (i.e., the specific values override and are used instead of the calculated transmission data block sizes).

According to an embodiment the first signaling indicates at least one combination of an MCS level and a resource allocation size and further indicates transmission data block size value associated with this combination, and the at least one combination of MCS level and resource allocation size is selected from combinations of MCS level and resource allocation size as stored in a fixed look-up table. As one non-limiting exemplary embodiment, selected combination of MCS level and resource allocation size shown in Table 5 are mapped to the specific transmission data block sizes. For instance, for the combination of $I_{MCS}=1$ and $N_{PRB}=4$, the transmission data block size is 144 instead of 152.

TABLE 5

Exemplary over-writing transmission data block sizes for selected combinations of MCS level and resource allocation size

| | $N_{PRB}$ | | | | | | | | | |
|---|---|---|---|---|---|---|---|---|---|---|
| $I_{MCS}$ | 1 | 2 | 3 | 4 | 5 | 6 | 7 | 8 | 9 | 10 |
| 0 | | | | | 144 | 176 | 224 | 224 | 256 | 256 |
| 1 | | | | 144 | 176 | 224 | 256 | 256 | 328 | 328 |
| 2 | | | 144 | 176 | 224 | 256 | 328 | 328 | | |
| 3 | | | 176 | 224 | 256 | 328 | | | | |
| 4 | | 144 | 224 | 256 | 328 | | | | | |
| 5 | | 176 | 256 | 328 | | | | | | |
| 6 | | 208 | 328 | | | | | | | |

TABLE 5-continued

Exemplary over-writing transmission data block sizes for selected combinations of MCS level and resource allocation size

| $I_{MCS}$ | 1 | 2 | 3 | 4 | 5 | 6 | 7 | 8 | 9 | 10 |
|---|---|---|---|---|---|---|---|---|---|---|
| 7 |  | 224 |  |  |  |  |  |  |  |  |
| 8 | 144 | 256 |  |  |  |  |  |  |  |  |
| 9 |  | 328 |  |  |  |  |  |  |  |  |
| 10 |  |  |  |  |  |  |  |  |  |  |
| 11 | 176 |  |  |  |  |  |  |  |  |  |
| 12 | 208 |  |  |  |  |  |  |  |  |  |
| 13 | 224 |  |  |  |  |  |  |  |  |  |
| 14 | 256 |  |  |  |  |  |  |  |  |  |
| 15 |  |  |  |  |  |  |  |  |  |  |
| 16 |  |  |  |  |  |  |  |  |  |  |
| 17 |  |  |  |  |  |  |  |  |  |  |
| 18 | 328 |  |  |  |  |  |  |  |  |  |
| 19 |  |  |  |  |  |  |  |  |  |  |
| . | . | . | . | . | . | . | . | . | . | . |

The selected combinations of MCS level and resource allocation size can be stored in a fixed look-up table associated with a service. The selected combinations of MCS level and resource allocation size can be fixed in the specification of the communication network. Hence, according to an embodiment the at least one combination of MCS level and resource allocation size is selected from combinations of MCS level and resource allocation size as fixed in a specification of the communication network.

The selected combinations of MCS level and resource allocation size can be configured to the UE from the network using higher layer signaling. That is, according to an embodiment the first signaling is higher layer signaling. One non-limiting exemplary higher layer signaling is radio resource control (RRC) signaling.

The selected combinations of MCS level and resource allocation size can be broadcast in a System Information Block (SIB) transmission. That is, according to an embodiment the first signaling is received as broadcast in a SIB transmission.

Embodiment 5

In an embodiment, an extra flag is introduced in the DCI message the flag could be a bit combination of a given set of bits in the DCI message or a bit that indicates that a TBS table should be used. That is, according to an embodiment the first signaling is received as a flag in a downlink control information, DCI, message. The flag could further be an RNTI.

This TBS table could be point out through the MCS table so that the MCS table directly indicates both TBS and modulation order for the TBS.

Given that the TBS sizes here are very specific it would in additional aspect be possible to limit the modulation order for them to some of the lower modulation orders for example quadrature phase shift keying (QPSK) and 16 QAM.

An example of a look-up table is shown in Table 6. It is further given that the table may of course contain more TBS entries and/or with different values. The order of them does not need to as given either in the table. Further the last entries in the table may also stipulate a retransmission of the same transport block with changed modulation order. In this embodiment the resource allocation would be separately defined from the TBS and MCS selection.

In another example the UE uses a TBS look-up table for the case of it being configured with SPS or UL grant free transmissions.

TABLE 6

Exemplary MCS/TBS look-up table

| MCS index $I_{MCS}$ | Modulation order $Q_m$ | TBS |
|---|---|---|
| 0 | 2 | 144 |
| 1 | 2 | 176 |
| 2 | 2 | 208 |
| 3 | 2 | 224 |
| 4 | 2 | 256 |
| 5 | 2 | 328 |
| 6 | 4 | 144 |
| 7 | 4 | 176 |
| 8 | 4 | 208 |
| 9 | 4 | 224 |
| 10 | 4 | 256 |
| 11 | 4 | 328 |
| 12 |  |  |
| 13 |  |  |
| 14 |  |  |
| 15 |  |  |
| 16 |  |  |
| 17 |  |  |
| 18 |  |  |
| 19 |  |  |
| 20 |  |  |
| 21 |  |  |
| 22 |  |  |
| 23 |  |  |
| 24 |  |  |
| 25 |  |  |
| 26 |  |  |
| 27 |  |  |
| 28 |  |  |

Figure 5:
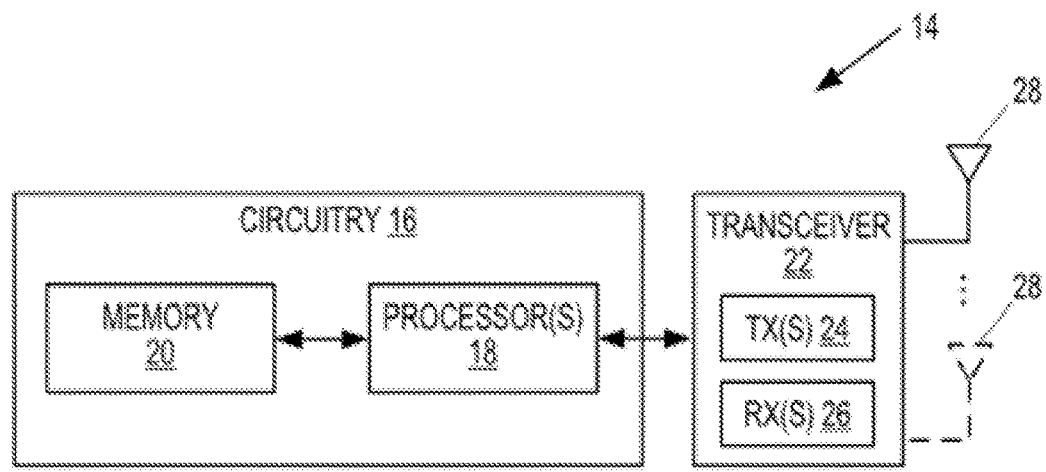
FIGS. 5 and 6 are block diagrams that illustrate a wireless device according to some embodiments of the present disclosure.

FIG. 5 is a schematic block diagram of the wireless device 14 according to some embodiments of the present disclosure. As illustrated, the wireless device 14 includes circuitry 16 comprising one or more processors 18 (e.g., Central Processing Units (CPUs), Application Specific Integrated Circuits (ASICs), Field Programmable Gate Arrays (FPGAs), and/or the like) and memory 20. The wireless device 14 also includes one or more transceivers 22 each including one or more transmitter 24 and one or more receivers 26 coupled to one or more antennas 28. In some embodiments, the functionality of the wireless device 14 described above may be fully or partially implemented in software that is, e.g., stored in the memory 20 and executed by the processor(s) 18.

In some embodiments, a computer program including instructions which, when executed by the at least one processor 18, causes the at least one processor 18 to carry out the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 6:
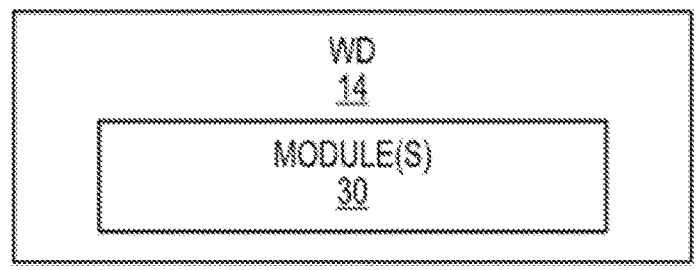

FIG. 6 is a schematic block diagram of the wireless device 14 according to some other embodiments of the present disclosure. The wireless device 14 includes one or more modules 30, each of which is implemented in software. The module(s) 30 provide the functionality of the wireless device 14 described herein. The module(s) 30 may comprise, for example, an obtaining module operable to perform step 100 of FIG. 3(a), a determination module operable to perform steps 100, 104 of FIG. 3(a), and a use module operable to perform step 108 of FIG. 3(a), an obtaining module operable to perform step 302 of FIG. 3(b), a receiving module operable to perform step 304 of FIG. 3(b), a receiving module operable to perform step 306 of FIG. 3(b), a determining module operable to perform step 308 of FIG. 3(b), an applying module operable to perform step 310 of FIG. 3(b), and a receiving module operable to perform step 312 of FIG. 3(b).

Figure 7:
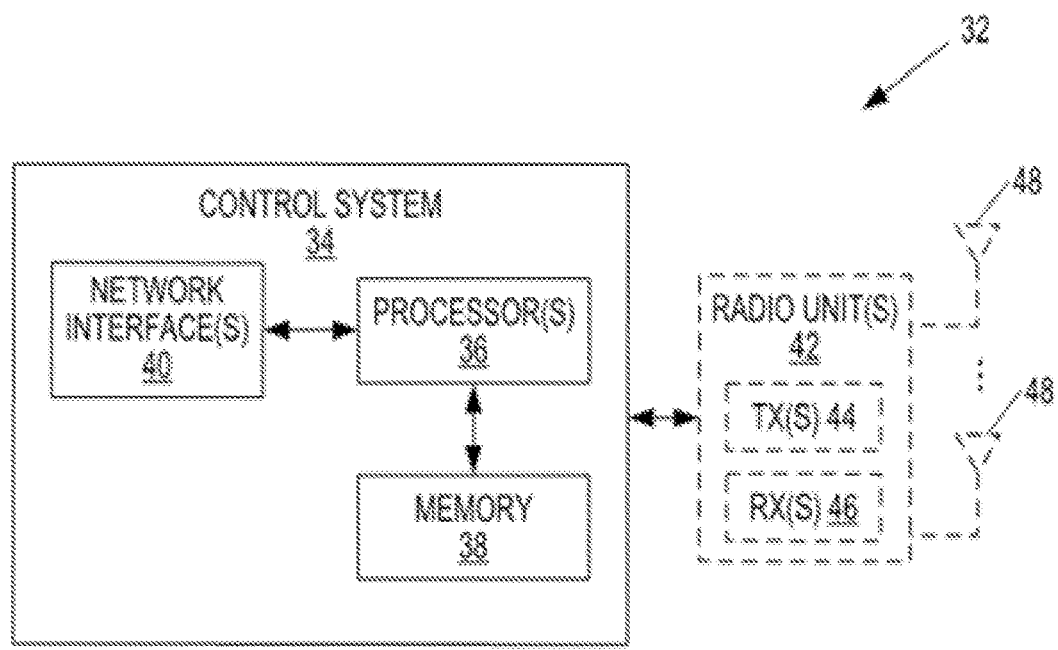
FIGS. 7 through 9 are block diagrams that illustrate a radio access node according to some embodiments of the present disclosure.

FIG. 7 is a schematic block diagram of a network node 32 (e.g., a radio access node 12) according to some embodiments of the present disclosure. As illustrated, the network node 32 includes a control system 34 that includes circuitry comprising one or more processors 36 (e.g., CPUs, ASICs, FPGAs, and/or the like) and memory 38. The control system 34 also includes a network interface 40. In embodiments in which the network node 32 is a radio access node 12, the network node 32 also includes one or more radio units 42 that each include one or more transmitters 44 and one or more receivers 46 coupled to one or more antennas 48. In some embodiments, the functionality of the network node 32 described above may be fully or partially implemented in software that is, e.g., stored in the memory 38 and executed by the processor(s) 36.

Figure 8:
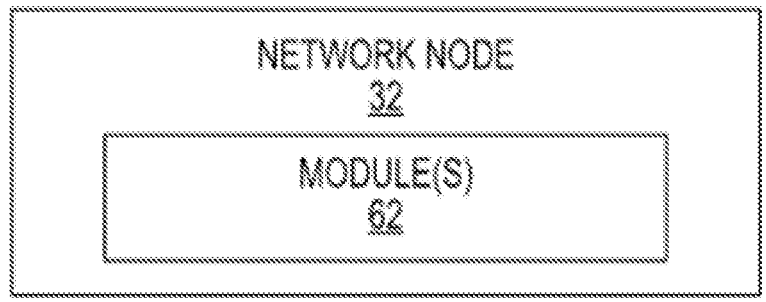

FIG. 8 is a schematic block diagram of the network node 32 (e.g., the radio access node 12) according to some other embodiments of the present disclosure. The network node 32 includes one or more modules 62, each of which is implemented in software. The module(s) 62 provide the functionality of the network node 32 described herein. The module(s) 62 may include a transmitting module operable to transmit or cause another node to transmit to a wireless device 14 information that allows determining a TDBS, as per steps 200-A and 200-B of FIG. 4(a), an obtaining module operable to perform step 402 of FIG. 4(b), and a sending module operable to perform step 404 of FIG. 4(b).

Figure 9:
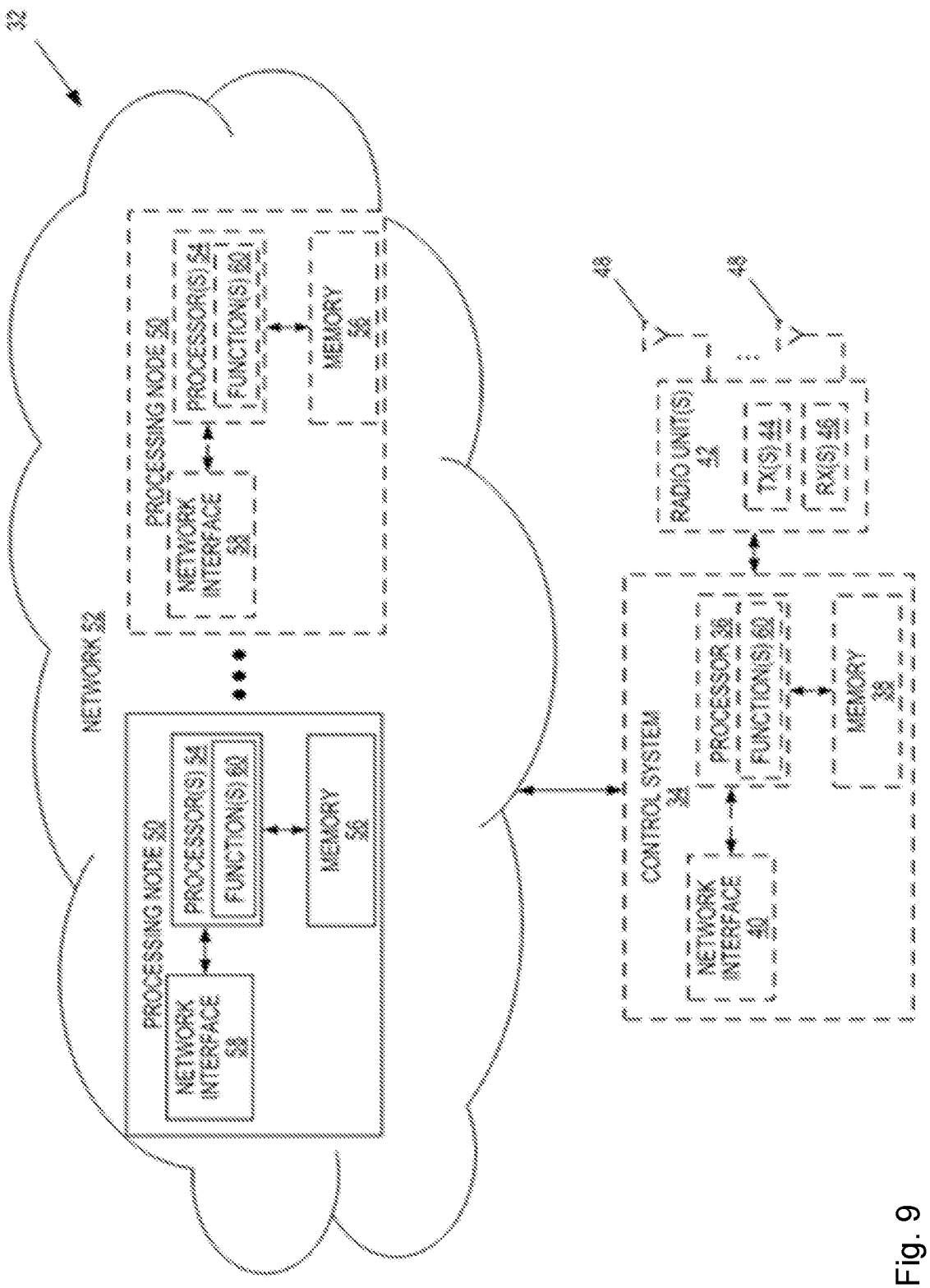

FIG. 9 is a schematic block diagram that illustrates a virtualized embodiment of the network node 32 (e.g., the radio access node 12) according to some embodiments of the present disclosure. As used herein, a "virtualized" network node 32 is a network node 32 in which at least a portion of the functionality of the network node 32 is implemented as a virtual component (e.g., via a virtual machine(s) executing on a physical processing node(s) in a network(s)). As illustrated, the network node 32 optionally includes the control system 34, as described with respect to FIG. 9. In addition, if the network node 32 is the radio access node 12, the network node 32 also includes the one or more radio units 42, as described with respect to FIG. 9. The control system 34 (if present) is connected to one or more processing nodes 50 coupled to or included as part of a network(s) 52 via the network interface 40. Alternatively, if the control system 34 is not present, the one or more radio units 42 (if present) are connected to the one or more processing nodes 50 via a network interface(s). Alternatively, all of the functionality of the network node 32 described herein may be implemented in the processing nodes 50 (i.e., the network node 32 does not include the control system 34 or the radio unit(s) 42). Each processing node 50 includes one or more processors 54 (e.g., CPUs, ASICs, FPGAs, and/or the like), memory 56, and a network interface 58.

In this example, functions 60 of the network node 32 described herein are implemented at the one or more processing nodes 50 or distributed across the control system 34 (if present) and the one or more processing nodes 50 in any desired manner. In some particular embodiments, some or all of the functions 60 of the network node 32 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 (if present) is used in order to carry out at least some of the desired functions. Notably, in some embodiments, the control system 34 may not be included, in which case the radio unit(s) 42 (if present) communicates directly with the processing node(s) 50 via an appropriate network interface(s).

In some embodiments, a computer program including instructions which, when executed by the at least one processor 36, 54, causes the at least one processor 36, 54 to carry out the functionality of the network node 32 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 56).

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A method of operating a wireless device in a communication network, the method comprising:
   obtaining a pre-defined rule for computing a default transmission data block size based on one or more input parameters selected from:
      a number of allocated physical resource blocks,
      an effective number of resource elements per physical resource block and/or symbol,
      a number of spatial layers,
      a modulation order, and
      a code rate; and receiving first signaling at least partially overriding values obtained by the pre-defined rule, wherein the first signaling is received as:
a broadcast in a System Information Block transmission; or
a flag in a downlink control information ("DCI") message and whether to limit the transmission data block size by partially overriding values obtained by the pre-defined rule depends on in which search space the DCI message is located.

2. The method of claim 1, wherein obtaining includes receiving second signaling indicative of the pre-defined rule and/or at least one of its input parameters.

3. The method of claim 1, wherein the pre-defined rule follows a pre-agreed specification of the communication network.

4. The method of claim 1, wherein the pre-defined rule for computing the transmission data block size comprises a factor given by:

$$N_{PRB} \cdot N_{RE} \cdot v \cdot Q_m \cdot r,$$

where $N_{PRB}$ represents the allocated number of physical resource blocks, where $N_{RE}$ represents the effective number of resource elements per physical resource block, where v represents the number of spatial layers, where $Q_m$ represents the modulation order, and where r represents the code rate.

5. The method of claim 4, wherein the pre-defined rule specifies the transmission data block size to be aligned with byte size.

6. The method of claim 4, wherein the pre-defined rule for computing the transmission data block size is given by:

$$C \cdot \left\lceil \frac{N_{PRB} \cdot N_{RE} \cdot v \cdot Q_m \cdot r}{C} \right\rceil,$$

where $\lceil x \rceil$ is a ceiling function, giving the smallest integer no smaller than x, and C is a positive integer representing a size unit.

7. The method of claim 6, where C=8.

8. The method of claim 1, wherein the first signaling indicates at least one combination of a Modulation and Coding Scheme ("MCS") level and a resource allocation size and further indicates transmission data block size value associated with this combination.

9. The method of claim 8, wherein the at least one combination of MCS level and resource allocation size is selected from combinations of MCS level and resource allocation size as stored in a fixed look-up table.

10. The method of claim 8, wherein the at least one combination of MCS level and resource allocation size is selected from combinations of MCS level and resource allocation size as fixed in a specification of the communication network.

11. The method of claim 1, wherein the first signaling is higher layer signaling.

12. The method of claim 1, wherein the first signaling is received as broadcast in the System Information Block transmission.

13. The method of claim 1, wherein the first signaling is received as the flag in the DCI message.

14. The method of claim 13, wherein the flag is a Radio Network Temporary Identifier.

15. The method of claim 1, wherein the first signaling limits the transmission data block size to a formula given by:

$$C \cdot \left\lceil \frac{N_{PRB} \cdot N_{RE} \cdot v \cdot Q_m \cdot r}{C} \right\rceil,$$

where $\lceil \chi \rceil$ is a ceiling function, giving the smallest integer no smaller than $\chi$, and C is a positive integer representing a size unit.

16. The method of claim 15, where C=8.

17. The method of claim 9, wherein whether to use the look-up table, a specification, or a formula depends on a bit in the DCI message.

18. The method of claim 1, wherein the first signaling limits the transmission data block size to 144, 176, 208, 224, 256, or 328 bits.

19. The method of claim 8, further comprising:
receiving a downlink assignment;
determining whether a combination of MCS level and a resource allocation size applicable for the downlink assignment corresponds to a combination indicated by the first signaling; and
responsive to a positive outcome of the determination, receiving downlink data in accordance with the downlink assignment applying a transmission data block size indicated by the first signaling.

20. The method of claim 1, further comprising:
receiving downlink data from a node of the communication network while applying the default transmission data block.

21. A method of operating a network node in a communication network, the method comprising:
obtaining a pre-defined rule for computing a default transmission data block size based on one or more input parameters selected from:
a number of allocated physical resource blocks,
an effective number of resource elements per physical resource block and/or symbol,
a number of spatial layers,
a modulation order, and
a code rate; and
transmitting first signaling at least partially overriding values obtained by the pre-defined rule, wherein the first signaling is received as:
a broadcast in a System Information Block transmission; or
a flag in a downlink control information ("DCI") message and whether to limit the transmission data block size by partially overriding values obtained by the pre-defined rule depends on in which search space the DCI message is located.

22. A wireless device for operation in a communication network, the wireless device comprising:
processing circuitry; and
memory coupled to the processing circuitry and having instructions stored therein that are executable by the processing circuitry to cause the wireless device to perform operations comprising:
obtaining a pre-defined rule for computing a default transmission data block size based on one or more input parameters selected from:
a number of allocated physical resource blocks,
an effective number of resource elements per physical resource block and/or symbol,
a number of spatial layers,
a modulation order, and
a code rate; and receiving first signaling at least partially overriding values obtained by the pre-defined rule, wherein the first signaling is received as:
- a broadcast in a System Information Block transmission; or
- a flag in a downlink control information ("DCI") message and whether to limit the transmission data block size by partially overriding values obtained by the pre-defined rule depends on in which search space the DCI message is located.

23. A network node for operation in a communication network, the network node comprising:
processing circuitry; and
memory coupled to the processing circuitry and having instructions stored therein that are executable by the processing circuitry to cause the network node to perform operations comprising:
obtaining a pre-defined rule for computing a default transmission data block size on one or more input parameters selected from:
a number of allocated physical resource blocks,
an effective number of resource elements per physical resource block and/or symbol,
a number of spatial layers,
a modulation order, and
a code rate; and
transmitting first signaling at least partially overriding values obtained by the pre-defined rule, wherein the first signaling is received as:
- a broadcast in a System Information Block transmission; or
- a flag in a downlink control information ("DCI") message and whether to limit the transmission data block size by partially overriding values obtained by the pre-defined rule depends on in which search space the DCI message is located.

24. A non-transitory computer-readable medium having instructions stored therein that are executable by a processor of a wireless device, causes the wireless device to perform operations comprising:
obtaining a pre-defined rule for computing a default transmission data block size based on one or more input parameters selected from:
a number of allocated physical resource blocks,
an effective number of resource elements per physical resource block and/or symbol,
a number of spatial layers,
a modulation order, and
a code rate; and receiving first signaling at least partially overriding values obtained by the pre-defined rule, wherein the first signaling is received as:
- a broadcast in a System Information Block transmission; or
- a flag in a downlink control information ("DCI") message and whether to limit the transmission data block size by partially overriding values obtained by the pre-defined rule depends on in which search space the DCI message is located.

25. A non-transitory computer-readable medium having instructions stored therein that are executable by a processor of a network node, causes the network node to perform operations comprising:
obtaining a pre-defined rule for computing a default transmission data block size based on one or more input parameters selected from:
a number of allocated physical resource blocks,
an effective number of resource elements per physical resource block and/or symbol,
a number of spatial layers,
a modulation order, and
a code rate; and
transmitting first signaling at least partially overriding values obtained by the pre-defined rule, wherein the first signaling is received as:
- a broadcast in a System Information Block transmission; or
- a flag in a downlink control information ("DCI") message and whether to limit the transmission data block size by partially overriding values obtained by the pre-defined rule depends on in which search space the DCI message is located.

26. The method of claim 1, wherein the one or more input parameters includes a number of allocated time-domain symbols.

27. The method of claim 21, wherein the pre-defined rule for computing the transmission data block size comprises a factor given by:

$$N_{PRB} \cdot N_{RE} \cdot v \cdot Q_m \cdot r,$$

where $N_{PRB}$ represents the allocated number of physical resource blocks, where $N_{RE}$ represents the effective number of resource elements per physical resource block, where v represents the number of spatial layers, where $Q_m$ represents the modulation order, and where r represents the code rate.

28. The wireless device of claim 22, wherein the pre-defined rule for computing the transmission data block size comprises a factor given by:

$$N_{PRB} \cdot N_{RE} \cdot v \cdot Q_m \cdot r,$$

where $N_{PRB}$ represents the allocated number of physical resource blocks, where $N_{RE}$ represents the effective number of resource elements per physical resource block, where v represents the number of spatial layers, where $Q_m$ represents the modulation order, and where r represents the code rate.

\* \* \* \* \*